(12) United States Patent
Werner et al.

(10) Patent No.: US 7,827,153 B2
(45) Date of Patent: Nov. 2, 2010

(54) SYSTEM AND METHOD TO PERFORM BULK OPERATION DATABASE CLEANUP

(75) Inventors: Horst Werner, Muhlhausen-Rettingheim (DE); Frank Rakowitz, Cordoba (DE)

(73) Assignee: SAP AG, Walldorf (DE)

( * ) Notice: Subject to any disclaimer, the term of this patent is extended or adjusted under 35 U.S.C. 154(b) by 376 days.

(21) Appl. No.: 11/960,478

(22) Filed: Dec. 19, 2007

(65) Prior Publication Data
US 2009/0164445 A1    Jun. 25, 2009

(51) Int. Cl.
*G06F 7/00* (2006.01)
(52) U.S. Cl. ............... 707/687; 707/690; 707/691; 707/692
(58) Field of Classification Search ............... None
See application file for complete search history.

(56) References Cited

U.S. PATENT DOCUMENTS

| | | | |
|---|---|---|---|
| 6,385,613 B1 * | 5/2002 | Grewell et al. ............. | 1/1 |
| 6,477,534 B1 * | 11/2002 | Acharya et al. ............. | 1/1 |
| 6,519,604 B1 * | 2/2003 | Acharya et al. ............. | 707/738 |
| 7,310,638 B1 * | 12/2007 | Blair ............................ | 707/4 |
| 7,461,076 B1 * | 12/2008 | Weissman et al. ........... | 1/1 |
| 2002/0095408 A1 * | 7/2002 | Cheng .......................... | 707/3 |
| 2004/0215626 A1 * | 10/2004 | Colossi et al. ............... | 707/100 |
| 2005/0262044 A1 * | 11/2005 | Chaudhuri et al. ............ | 707/1 |
| 2006/0053129 A1 * | 3/2006 | Motwani et al. ............. | 707/101 |
| 2006/0149769 A1 * | 7/2006 | McCormack et al. ........ | 707/101 |
| 2007/0038618 A1 * | 2/2007 | Kosciusko et al. ........... | 707/4 |
| 2007/0130136 A1 * | 6/2007 | Cambot et al. ............... | 707/4 |
| 2007/0136212 A1 * | 6/2007 | Carpenter et al. ........... | 705/400 |
| 2008/0114744 A1 * | 5/2008 | Colby et al. .................. | 707/4 |
| 2008/0120286 A1 * | 5/2008 | Dettinger et al. ............. | 707/5 |
| 2008/0294420 A1 * | 11/2008 | Eilam et al. .................. | 703/22 |
| 2009/0006302 A1 * | 1/2009 | Fan et al. ..................... | 706/48 |
| 2009/0006349 A1 * | 1/2009 | Fuxman et al. ............... | 707/4 |
| 2010/0042654 A1 * | 2/2010 | Heller et al. ................. | 707/104.1 |

OTHER PUBLICATIONS

Werner, H., "The Semaril," Manual and FAQs, retrieved from Internet at: <http://www.thesemaril.de/en/index.html> on Jul. 15, 2008, 59 pages.

* cited by examiner

*Primary Examiner*—Charles Kim
*Assistant Examiner*—Jessica N Le
(74) *Attorney, Agent, or Firm*—Blakely, Sokoloff, Taylor & Zafman, LLP

(57) ABSTRACT

A system and method to efficiently perform database cleanup. Database objects are initially grouped based on selected attributes. The groups may be filtered to identify erroneous data within the group. Structure query language statements are then dynamically generated to directly correct the erroneous data within the database.

9 Claims, 2 Drawing Sheets

SYSTEM AND METHOD TO PERFORM BULK OPERATION DATABASE CLEANUP

BACKGROUND

1. Field

Embodiments of the invention relate to data processing systems. More specifically, embodiments of the invention relate to correction of erroneous data in a database.

2. Background

In data warehousing, data is typically copied from transaction systems and restructured to facilitate querying and reporting of the data. When different systems are involved errors, such as the incomplete, incorrect or inconsistent data may occur. Identification of and cleanup of such errors requires significant manual work performed on the database using structured query language (SQL) statements. This requires users to have a significant knowledge of SQL and tends to be both time and labor intensive.

Outside the database domain some tools exist for large scale maintenance of incomplete or inconsistent data. Particularly, semantic nets are structures that, in contrast to database structures, are rather flexible and do not generally enforce compliance to predefined schemes. Instances of the same entity type can have different kinds of attributes and cardinalities of relationships can vary. Therefore, semantic nets can be considered an extreme example of potentially incomplete and inconsistent data. Semantic net is composed of nodes and relationships between these nodes. The maintenance tool for semantic nets uses the following concepts for mass manipulation of data:

- a "bag" (set) of nodes in the semantic net. The bag object has two special features: It can evaluate which relations all nodes in the set have in common and it can also determine which relations differentiate subgroups of nodes in the set from each other ("dynamic grouping"). Furthermore, the bag allows the mass maintenance of relationships for all nodes in the bag.
- a "filter," which selects those nodes from a set which have certain relations
- a related entity processor that, starting from a set of nodes, collects the set of nodes which are of a certain category and related to the nodes in the set by a given relation type
- a macro recorder that allows sequences of manipulations of bags and node relationships to be stored.

These features make it possible to detect and correct the inconsistencies and gaps that inevitably occur in a manually maintained semantic net.

Unfortunately, in a data warehousing context these features cannot be directly applied. Specifically, the semantic net tool has no notion of a separation of key and human readable names. The identification of nodes is done only by name, which fails as soon as two or more nodes have the same human readable name. Additionally, semantic nets have no concept for evaluating attribute values. Finally, the existing semantic net tool performs all mass operations on nodes within the main memory. This is memory intensive and likely to fail on almost all large data warehousing cases due to insufficient memory.

SUMMARY

A system and method to efficiently perform database cleanup is disclosed. Database objects are initially grouped based on selected attributes. The groups may be filtered to identify erroneous data within the group. Structured query language statements are then dynamically generated to directly correct the erroneous data within the database.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
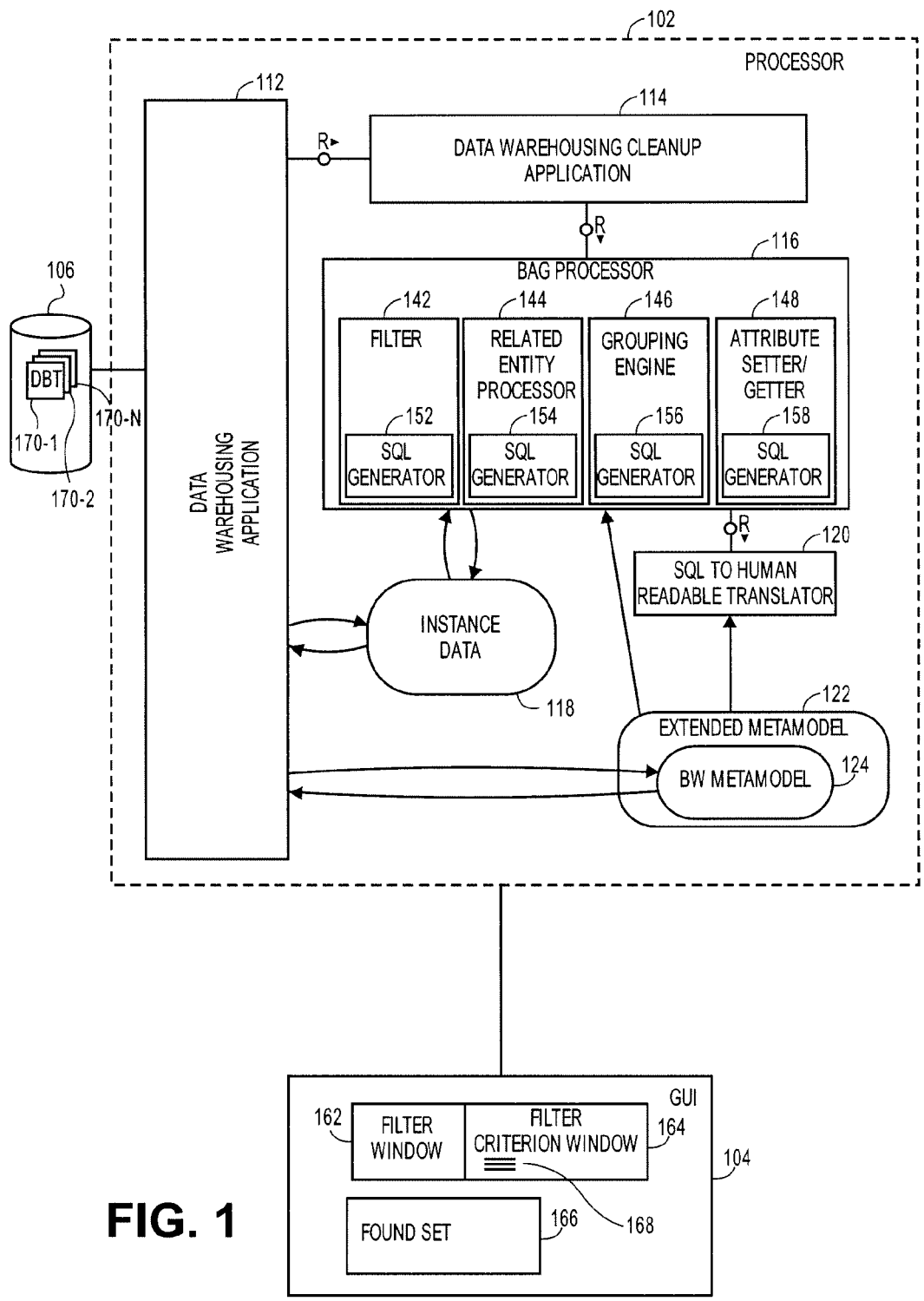
FIG. 1 is a block diagram of a system of one embodiment of the invention.

FIG. 1 is a block diagram of a system of one embodiment of the invention. A database 106 may be used by a processor 102 to persistently store a plurality of database tables 170-1, 170-2, 170-N (generically 170). Processor 102 executes a data warehousing application 112, which may be used to evaluate data in the database tables 170 in the database 106 for specific reports. Data warehousing application 112 may also retrieve instances of the database tables 170 in the processor as instance data 118. Data warehousing application 112 uses data warehousing cleanup application 114 to identify and correct erroneous data in the database 106. In some embodiments, data warehousing cleanup application 114 may be integrated into data warehousing application 112.

To allow the data warehousing cleanup application to correct erroneous data in the database, an extended metamodel 122 of the database is needed. A basic metamodel 124 is typically provided by the data warehousing application 112. However, the basic metamodel provides no notion of human readable description. To permit dynamic creation of structured query language (SQL) statements based on non-technical concepts, the user's knowledge domain, the metamodel must be extended to include human readable descriptions of entities, fields and foreign key relationships. Thus, the extended metamodel 122 provides such additional human readable descriptions. In some embodiments, the database fields that should be used for grouping or evaluation of common attributes are flagged in the extended metamodel 122. In other embodiments, additional relations and corresponding SQL queries may also be modelled in the extended metamodel 122.

Data warehousing cleanup application 114 uses bag processor 116 to sort and manipulate instance data 118 to identify and subsequently correct erroneous data. The manipulation and correction is performed with dynamically generated SQL statements based on the extended metamodel 122.

While "bags" are discussed briefly above in connection with semantic nets, the term takes on a different meaning in the content of database cleanup. "Bags" as used in the context of the database cleanup invention is a set of instances alternatively referred to as database objects having certain common attributes. A database object includes a plurality of fields (attributes) that may form the basis of sorting or grouping. As used herein, "set" and "subset" includes any positive integer number of members, but exclude the empty set.

Bags can be manipulated in several ways. The contents of a first bag may be overwritten by the content of a second bag. The contents of a first bag may be added or subtracted from a second bag. The intersection of two bags may be obtained. Individual entities may be added to or removed from a bag.

These manipulations can be performed without making changes to the original database tables 170 because the bags are temporary tables containing references to the data. In one embodiment, bags are represented as a separate "index type" table within the database 106. In an alternative embodiment, bags are represented as a collection of keys in the main memory.

One critical feature of bag processor 116 is an ability to group database objects into subgroups having particular characteristics in common. Each subgroup can then be treated as a bag and represented as its own bag object. To that end, grouping engine 146 performs grouping operations on instance data 118.

In performing the grouping, first all potential subgroups are identified. Relevant attributes are obtained from the extended metamodel 122 maintained by the data warehousing application 112. As noted above, in some embodiments, the attributes fields suitable for grouping may be flagged in the extended metamodel 122. However, in some embodiments, no such flagging exits.

It should be clear that not all attribute fields are equally suitable for grouping. For example, strings containing free text are unlikely to be useful. Where the grouping fields are not flagged in the metamodel, potential grouping candidates must be identified. Potential candidates include: i) foreign keys representing an n to one relationship (e.g., represented by a field rather than a joined table); ii) strings/codes with fixed value ranges; iii) strings with a fixed length below given threshold (e.g., 40-80 characters); iv) numeric and date fields; and v) one-to-one relationships if they are optional, i.e. if the entity instances in question stem from different tables 170 where the relationship exists some of the database tables 170 and doesn't in others.

For these fields, an object is created in main memory containing a collection of subgroup descriptions and a counter for the number of instances in a largest subgroup. A subgroup descriptor is effectively a string containing the "WHERE" clause of the corresponding SELECT statement and a counter for the number of instances in the subgroup. For each field, a SELECT DISTINCT query (from SQL generator 156) is executed, which gives the range of actual values in that field. If the number of instances and the result of the query is large, it is desirable to permit multiple values in a single subgroup. Accordingly, a maximal number of subgroups is determined for the application and the values are clustered into a corresponding number of subgroups.

In the case of ordinal data types, such as numbers and dates, appropriate intervals are created. In one embodiment, first the minimal and maximal values are read to define the initial interval. Then, while the number of intervals is less than the number of allowed subgroups, for each interval containing more than two times the mean number of elements per subgroup, and having more than one distinct value, the interval is divided into two intervals. The value separating the subintervals is the mean value between the existing interval borders. Other embodiments may use alternative methods for establishing the intervals.

For fields which are not ordinal (e.g., strings and foreign keys), but that are allowed to be empty, two subgroups are created. The first subgroup of the database objects in which the field is empty and the second subgroup of the database objects in which the field is not empty. A subgroup for elements with empty fields is created for all criteria where the field is allowed to be empty.

If none of these grouping strategies is applicable, the criteria (field) is discarded as a basis for grouping. The number of elements in all created subgroups is then counted by a SELECT COUNT query and the largest subgroup is identified. The size of the largest subgroup is indicative of the ability of that grouping criterion to reduce the search space. This provides a basis for comparison between different acceptable grouping criteria. For example, a criterion that results in two subgroups having fifty elements each is preferred over a criterion which results in two subgroups, one having two elements and the other having ninety-eight. Thus, there is an inverse ranking based on size of the largest subgroup when comparing different possible grouping criteria. In this manner, the grouping engine 146 creates a number of groups. Each such group may be further processed as a bag within the bag processor 116.

The filter 142 within bag processor 116 uses human readable descriptions of selection criteria for database objects (analogous to the technical concept of the "WHERE" part of an SQL query). As previously noted, these human readable descriptions can be obtained from the extended metamodel 122. The filter 142 can specify attribute values and/or relations to other database objects or the existence or non-existence of such a relation or attribute value. The filter 142 can be applied to a bag so that only the database objects matching the filter criteria remain in the bag. Alternatively, the filter can be used to query the entire database for matching entities, which may then be instantiated as a bag.

To permit a user to establish the desired filter criteria, a graphical user interface 104 is provided. The filter criteria window includes filter criteria 168, which may be individually dragged into filter window 162 to construct a filter. The found set of database entries correspond to the application of the filter 142 may be displayed in window 166 of GUI 104.

Related entity processor 144 permits the derivation of a second set of database objects from an original set of database objects included in the bag. The processor refers to foreign key relationships and can use the relationships that are not originally modelled for an entity if an inverse relationship is modelled for a dependent entity. For example, a related entity processor can evaluate a relation "contains employees" for an entity "department" even if the database table for the department does not contain a reference to the employees, but rather the employee table contains a field "department." The modelling of the additional relationship may be done in the data warehousing cleanup application 114. Significantly, the related entity processor 144 provides the results of the derivation in the human readable form.

Attribute setting/getting 148 allows a bag to be queried to retrieve a subset having a particular "gotten" value or values. The subset may then be instantiated as a new bag. In its "set" function, attribute setting/getting module 148 may change, e.g., "set" an attribute of the bag and therefore all members of the bag on which it operates. Those changes are propagated to the original database table and effectively permits a batch change of erroneous attribute values.

Each of the prior constituent models 142, 144, 146, 148 of bag processor 116 includes an SQL generator 152, 154, 156, 158 respectively to perform its dynamic SQL generation to permit the module to perform respective function. The SQL generators 152, 154, 156, 158 get as input requests formulated in terms of entity types and associations. For example, the given a set of products find all orders that are referenced by one of the products using association type "is part of." The SQL generator first retrieves the table names for the entities product and order and the table name and foreign key fields linking the products to the orders. Then puts together a JOIN statement containing the names of these tables and fields.

The SQL statements are then performed on the instance data 118. In the case of query statements, the results are temporary tables. The contents of these tables is translated back into human readable form by SQL human readable translator 120 (discussed below), which uses the extended metamodel 122 to facilitate the translation. The bag and subgroup objects that are thus created and passed back to the data warehousing cleanup application 114 still contain the metadata and the references to the temporary tables which contain the instances so that further operations can be performed by creating SQL statements which operate on these temporary tables.

The GUI 104, briefly discussed above, heavily relies on the translation of field names and relationships into human-readable terms. An SQL to human readable translation 120 interfaces with the extended metamodel 122 to translate the display of tables and selection/filter criteria. In the case of attributes, only the field name needs to be translated, but in case of foreign key relationships, the keys are replaced by the human-readable name of the referred entity. To this end, the SQL description of a table is extended by the corresponding JOIN based on the metadata.

This allows a user of the system to make use of all existing relationships without knowing about the internal table structures. Additionally, complex evaluations that are usually coded into long SQL statements are broken down into a sequence of applying filters, related entity processors and set operations to bags of entities. After each of these operations, the contents of the resulting bag can be inspected by the user. This enables the user to flexibly adapt his approach to the specific inconsistencies of the data the user has in mind.

In one embodiment, the bags, filters and related entity processors are visualized as objects that can be combined by means of drag and drop operations to allow efficient manipulation of the underlying data, e.g., the filter criteria 168.

An illustrative example follows. Given that there is an entity "order" that has the following attributes:
 product
 quantity
 responsible department
 process status
 availability status Now assume that a number of orders have the process status "ready for shipment" and the availability status "not available." This would clearly be an inconsistency. Discovering such an inconsistency may happen like this:

A user queries the database using a filter on orders that have the process status "ready for shipment" and responsible department XY.

The result is a bag, which displays the relations and attributes that are common to all entities in the bag. As expected all these have the attribute "responsible department XY". But unexpectedly, the attribute "available" does not appear in the list of common relations and attributes.

The user now asks the system to divide the bag into subgroups, selecting the availability status as criterion. He gets an overview telling him that 3278 orders have the status "available" and 37 have the status "not available."

The user selects the second subgroup into a bag and again, the common attributes of these entities are displayed.

The system shows that all orders with inconsistent status refer to the same product.

Further investigation shows that the product is actually available.

The user changes the availability attribute to "available" for the bag, which actually changes all entities in the bag. The inconsistency is thus repaired.

Figure 2:
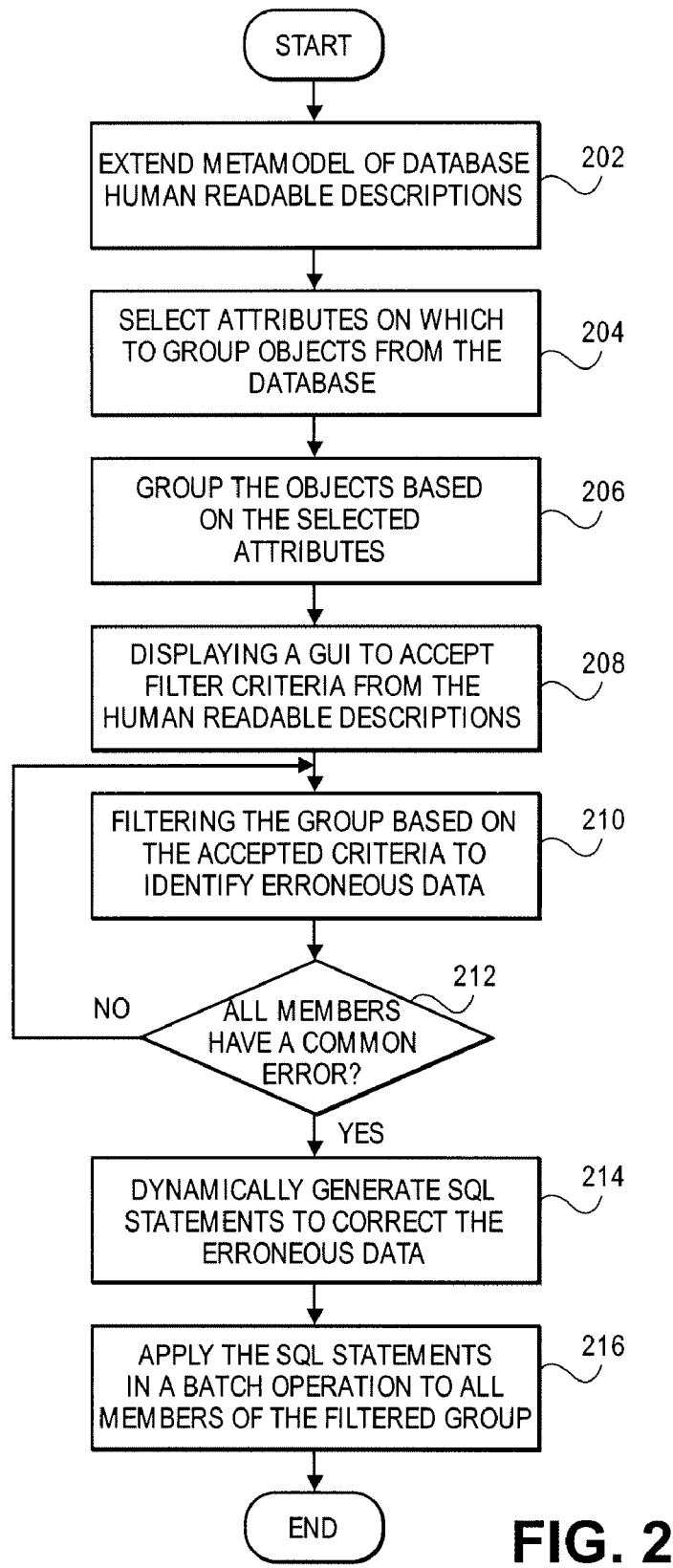
FIG. 2 is a flow diagram of operation in a system of one embodiment of the invention.

FIG. 2 is a flow diagram of operation in a system of one embodiment of the invention. At block 202, metamodel of the database is extended with human readable descriptions of the entity types, field names and foreign key relations. At block 204, attributes on which to group objects from the database are selected. In one embodiment, this selection may be based on flags existing in the extended metamodel. In another embodiment of the invention, various fields are automatically examined for suitability for grouping, organized into the subgroups, and ranked based on appropriateness using the grouping techniques described above.

At block 206, the objects are grouped into groups and subgroups based on the selected attributes. At block 208, GUI is displayed to accept filter criteria based on the human readable descriptions. At block 210, the group is filtered based on the accepted criteria to identify erroneous data. The determination is made at decision block 212 if all members have a common error. This may be done by, for example, performing a SELECT DISTINCT query on an attribute field. If the number of lines of the result is one, a second query may be executed to get the number of instances where the field is empty. If the number is zero, the attribute value in the SELECT DISTINCT result is common to all data instances. If that data value is determined to be erroneous, all members have a common error.

Where all members have a common error, a SQL statement is generated at block 214 to correct the erroneous data. At block 216, the SQL statement is applied in a batch operation to all members of the filtered group, thereby directly changing the erroneous data in the database.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A computer implemented method to perform bulk operation database cleanup comprising:

extending a metamodel of a database in a data warehousing application including human readable descriptions of plurality of entities, fields and foreign key relationships;

selecting attributes on which to group objects from the database, wherein the selecting is based on flags existing in the extended metamodel;

grouping objects from a database based on selected attributes by performing a SELECT DISTINCT query on a selected attribute values, defining a number of subgroups less than a number of instances returned from the query, and allocating instances returned from the query among the subgroups;

displaying a graphical user interface (GUI) to accept filter criteria from the human readable descriptions of entities, fields and foreign key relationships;

filtering the grouped objects based on the accepted criteria to identify erroneous data;

identifying whether a common attribute shared by all members of a group;

dynamically generating structured query language (SQL) statements to directly correct the erroneous data within the database; and applying the SQL statements in a batch operation on the all members of the filtered grouped objects.

2. The method of claim 1 wherein filtering comprises:
dragging and dropping the filter criteria within the graphical user interface.

3. The method of claim 1 wherein selecting comprises:
identifying a grouping suitability of an attribute field.

4. A system to perform bulk operation database cleanup comprising:
a database;
a processor;
a memory coupled to the processor for storing the database;
an extended metamodel of the database in a data warehousing application including human readable descriptions of entities, fields and foreign key relationships;
selecting attributes module on which to group objects from the database, wherein the selecting is based on flags existing in the extended metamodel;
grouping objects module from a database based on selected attributes by performing a SELECT DISTINCT query on a selected attribute values, defining a number of subgroups less than a number of instances returned from the query, and allocating instances returned from the query among the subgroups;
displaying a graphical user interface (GUI) module to accept filter criteria from the human readable descriptions of entities, fields and foreign key relationships;
filtering module to apply a filter to the grouped objects based on the accepted criteria to identify erroneous data;

identifying a common attribute shared by all members of a group;
structured query language (SQL) generator to dynamically create SQL statements to directly modify the erroneous data within the database; and
applying module to apply the SQL statements in a batch operation on the all members of the filtered grouped objects.

5. The system of claim 4 further comprising:
an SQL to human readable translator.

6. The system of claim 4 further comprising:
a related entity processor to derive a second set of database objects from a first set of database objects having a defined relationship to the second set of database objects.

7. A non-transitory machine-accessible storage medium containing instructions that, when executed, cause a machine to:
extending a metamodel of a database in a data warehousing application including human readable descriptions of entities, fields and foreign key relationships;
selecting attributes on which to group objects from the database, wherein the selecting is based on flags existing in the extended metamodel;
grouping objects from a database based on selected attributes by performing a SELECT DISTINCT query on a selected attribute values, defining a number of subgroups less than a number of instances returned from the query, and allocating instances returned from the query among the subgroups;
displaying a graphical user interface (GUI) to accept filter criteria from the human readable descriptions of entities, fields and foreign key relationships;
filtering the grouped objects based on the accepted criteria to identify erroneous data;
identifying a common attribute shared by all members of a group;
dynamically generating structured query language (SQL) statements to directly correct the erroneous data within the database; and
applying the SQL statements in a batch operation on the all members of the filtered grouped objects.

8. The non-transitory machine-accessible storage medium of claim 7, wherein the instructions causing the machine to filter cause the machine to:
accept the filter criteria from a drag and drop operation within the graphical user interface.

9. The non-transitory machine-accessible storage medium of claim 7, wherein the instructions causing the machine to select cause the machine to:
identify a grouping suitability of an attribute field.

* * * * *